Sept. 15, 1953     A. W. GAUBATZ     2,652,271

TURBINE WHEEL MOUNTING

Filed Jan. 5, 1950

Inventor
Arthur W. Gaubatz
By Willito, Helwig & Baillio
Attorneys

Patented Sept. 15, 1953

2,652,271

UNITED STATES PATENT OFFICE 2,652,271

TURBINE WHEEL MOUNTING

Arthur W. Gaubatz, Indianapolis, Ind., assignor to General Motors Corporation, Detroit, Mich., a corporation of Delaware Application January 5, 1950, Serial No. 136,971

7 Claims. (Cl. 287—52.05)

The present invention relates to the construction of rotors for rotary machines and has special reference to an improved structure for securing rotor wheels to the shaft of an axial flow elastic fluid turbine or compressor.

A principal object of the invention is to provide a rotor construction in which the amount of time, labor and expense involved in making, finishing and balancing the rotor assembly is materially reduced. Formerly a very expensive construction was often necessary because of the relatively large amount of work required not merely in forming the rotor but also in assembling the many parts of such a rotor structure and thereafter trueing or balancing it.

Another object of the invention is to provide a wheel mounting construction which ensures perfect centering and balancing of rotor wheels or discs on a shaft and particularly on the shaft of a turbine or compressor. This is accomplished in the present invention through the use of unsplined cylindrical portions of a partially splined shaft in conjunction with rotor wheel splines. Although turbine rotor wheels in the past have very often been splined to the turbine shaft, it has been customary to spline the shaft or its equivalent throughout the thickness of the base or hub of the wheel. Precise centering cannot easily be attained solely through the use of mating spline teeth because variations of seemingly negligible amounts in the dimensions of the splines will result in an unbalancing of the turbine rotor and cause serious and destructive vibrations.

Inasmuch as the shaft of the present invention comprises splined portions of the shaft axially adjacent to unsplined portions, the rotor wheel may be seated so as to overlap both the splined and unsplined portions of the shaft. This construction allows the transmission of torque through the splines and at the same time permits centering of the rotor wheels by seating the easily and accurately machined lands of the wheel splines upon these unsplined cylindrical shaft portions, these latter being considerably more adaptable to exact machining than the internal spline grooves or splineways of the wheels. To ensure precise seating and centering of these wheels it is necessary to have the diameter of the unsplined cylindrical portions of the shaft slightly greater than the diametric distances between the splineways of adjacent splined sections of the shaft.

For a better understanding of the nature and objects of the invention reference is made to the specification wherein there is described one embodiment of the invention which is illustrated in the accompanying drawing, in which.

Figure 1:
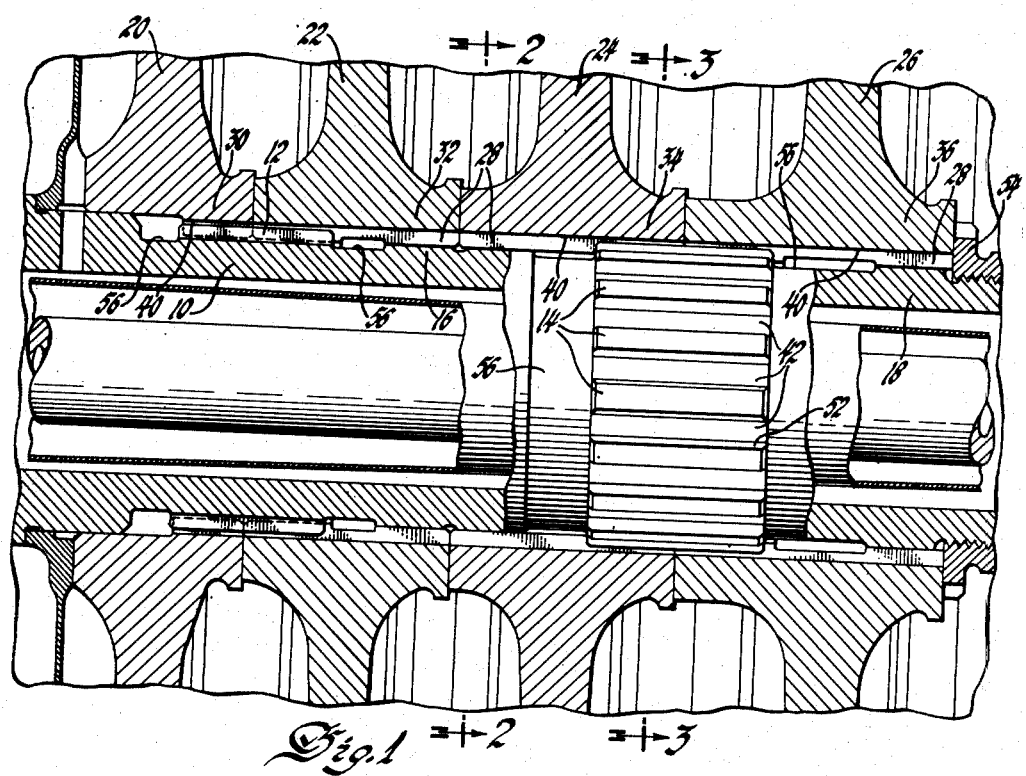
Figure 1 is a fragmentary longitudinal view, with parts broken away and in section, of a rotor of an axial flow elastic fluid turbine provided with a wheel and shaft assembly embodying the invention.

Referring to the drawing, the rotor of an axial flow elastic fluid turbine having a shaft 10 is shown in Figure 1. The shaft 10 comprises segments containing spline teeth 12 and 14, preferably circumscribing the shaft as shown, which splined segments are alternately axially separated by unsplined cylindrical portions 16 and 18 of the shaft. Rotor wheels or discs 22, 24 and 26 contain internal axial splines 28 throughout the thickness of the rotor disc hubs 32, 34 and 36, respectively. As shown in the drawing, the unsplined portions 16 and 18 of the shaft have diameters less than the distance between lands 38 and 38', for example, of diametrically opposite shaft spline teeth. This construction allows the shaft spline teeth 12 and 14 to mesh with corresponding recesses or splineways 40 in the hubs 30, 32, 34 and 36 and the teeth 28 of the wheel hubs to mesh in the same way with splineways 42 in the shaft 10.

Considering only rotor wheel 24 for the purposes of illustration, Figure 1 shows that it is positioned on the shaft 10 so as to have the base or hub 34 of the wheel 24 axially overlap both shaft spline teeth 14 and an unsplined cylindrical segment 16 of the shaft. The arrangement permits the wheel spline teeth 28 to engage the spline teeth 14 of the shaft 10 throughout only a portion of the length of the wheel spline teeth 28, the remaining portions of the wheel spline teeth extending onto an unsplined or pilot segment 16 of the shaft.

Figure 2:
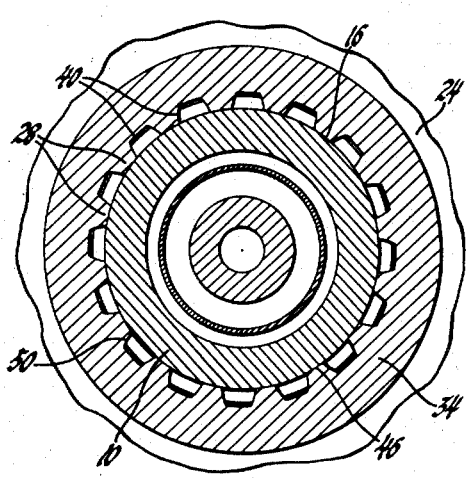
Figure 2 is a fragmentary sectional view along the line 2—2 of Figure 1 showing the seating of the wheel splines upon an unsplined section of the shaft.
Figure 3:
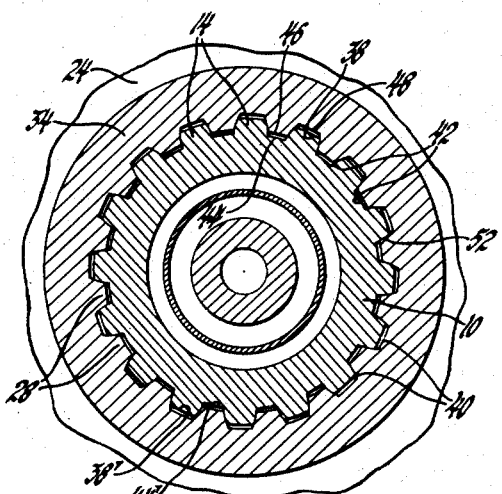
Figure 3 is a fragmentary section along the line 3—3 of Figure 1 showing the details of construction of wheel disc and shaft splines.

As best shown in Figures 2 and 3 taken in conjunction, the splineways 42 of the shaft 10 are of a depth sufficient to permit the diameters of the unsplined portions 16 of the shaft to be slightly greater than the distance between the roots or bases 44 and 44', for example, of diametrically opposite splineways. Such a construction causes the lands 46 of wheel spline teeth 28 to seat upon an unsplined cylindrical segment 16 of the shaft, while preventing the lands 38 of the shaft spline teeth 14 and the bases 44 of the shaft splineways 42 from contacting the wheel splineway bases 48 and the lands 46 of the disc spline teeth 28, respectively. The flanks 50 and 52 of the wheel spline teeth and the shaft spline teeth, respectively, are the only areas of actual contact between the wheel splines and the shaft splines. For purposes of description the amount of clearance between the lands of the spline teeth of one member and the splineway bases of the other member has been somewhat exaggerated in the drawing.

This arrangement of the spline teeth is advantageous to ensure perfect centering of the turbine rotor wheel 24 on the shaft because the lands 46 of the wheel spline teeth 28 and the cylindrical portions 16 of the shaft 10 are easily accessible for exact machining, while the bases 44 and 48, respectively, of both shaft and wheel splineways are not. Inasmuch as the lands 46 of the wheel spline teeth 28 and the unsplined cylindrical segments 16, both of which are accurately machined, are the only radial contact points between the shaft and wheel, the center of the shaft is maintained in alignment with the centers of the disc hubs under all conditions. Static and dynamic balance of the turbine wheel is thereby more readily attained.

It will be noted that the rotor wheels are preferably arranged in pairs as shown in the embodiment of the invention illustrated. The shaft spline teeth 12 engage two rotor wheel hubs 30 and 32, while the next set of shaft spline teeth 14 engage another pair of wheel hubs 34 and 36. It is possible, of course, to spline the shaft in such a manner as to provide one set of shaft splines for every wheel. The preferred arrangement shown in the drawing, however, simplifies the construction of the shaft inasmuch as only half as many spline segments of the shaft are required as would be necessary if the shaft splines were engaged by the same relative portions of the spline teeth of every rotor disc. The wheels may be held together axially by clamping devices such as the threaded collar 54 shown in Figure 1.

Clearance grooves 56 are provided between the shaft splines and the cylindrical sections of the shaft to facilitate the milling or broaching operations involved in forming the shaft splines.

While the invention has been described in its application to the mounting of rotor wheels upon the shaft of an axial flow turbine or compressor, it will be understood that the structure is of utility in any shaft and hub assembly where adjacent hubs of discs, wheels, or the like are to be supported upon a shaft, particularly where accurate alignment and dynamic balance are important.

I claim:

1. In an elastic fluid turbine or compressor, a rotor wheel mounting construction comprising a shaft having a series of axially splined segments, each of which splined segments is separated axially from adjacent splined segments by unsplined segments of the shaft, the diameters of the unsplined segments being substantially equal and being less than the diametric distance between the lands of the shaft splines but slightly greater than the diametric distance between shaft splineways; and, mounted on the shaft, a plurality of turbine wheels having central openings with internal axial splines, each wheel being seated on the shaft so as to overlap both a splined and unsplined segment of the shaft, the flanks of the shaft splines engaging a portion of the flanks of the wheel spline teeth and the lands of another portion of the wheel spline teeth being seated upon an unsplined surface of the turbine shaft to center the wheel on the shaft.

2. A rotary assembly comprising a shaft and a pair of elements mounted thereon to rotate therewith, each element having an internally splined hub, the shaft having a splined portion whose splines mesh with the splines of both of the hubs and having on each side of the splined portion a cylindrical portion, the splines of each hub extending axially beyond the splined portion of the shaft and having their lands seated on a cylindrical portion of the shaft, the lands of the hub splines being radially spaced from the bases of the shaft splineways, and the cylindrical portions being of substantially equal diameter.

3. An elastic fluid turbine engine comprising a rotatable shaft provided with a series of segments having longitudinally extending external splines which are axially separated by cylindrical sections of the shaft, a plurality of rotor wheels provided with abutting hub portions mounted on said shaft, each of said hub portions being provided with longitudinally extending internal splines which engage a portion of the shaft splines and which overlap an adjacent cylindrical section of the shaft, the diameters of the cylindrical sections of the shaft being less than the distance between the lands of diametrically opposite shaft splines and sufficiently greater than the distance between diametrically opposite shaft splineways to cause the lands of the spline teeth on the hub to contact only the cylindrical portions of the shaft and to prevent the lands of the hub spline teeth and the shaft spline teeth from contacting the splineway bases of the shaft and hubs, respectively.

4. In an elastic fluid turbine engine, the combination of a shaft and a pair of turbine wheels mounted thereon to rotate therewith, each of said turbine wheels having internally splined hubs with abutting end faces to maintain said elements in assembled axial position, said shaft being provided with cylindrical portions separated by an axially interjacent splined portion whose splines mesh with the splines of both of the hubs, the splines of each hub extending axially beyond the splined portion of the shaft and having its lands seated on one of the cylindrical portions of the shaft, the lands of the hub splines being radially spaced from the bases of the shaft splineways.

5. A rotary assembly comprising, in combination, a shaft with alternately splined and unsplined portions along its length, a plurality of elements mounted on the shaft having abutting hubs which are centrally apertured and internally splined in an axial direction, the splines of each hub being seated upon both splined and unsplined portions of the shaft to center the hubs on the shaft and secure the hubs to the shaft, and means to retain the elements on the shaft.

6. A multidisk rotor comprising, in combination, a shaft, the shaft being formed with a plurality of cylindrical portions of circular cross-section and a plurality of longitudinally splined cylindrical sections; a plurality of disks mounted on the shaft, each disk having a hub with a longitudinally splined cylindrical internal opening; the disks being located on the shaft so that the hub of each disk engages both a said portion and a said section of the shaft, the portions engaging the lands of the hub splines for diametrical location of the disks and the faces of the splines of the hubs engaging the faces of the splines of the sections for transfer of torque between the disks and shaft, the said shaft portions being of substantially the same diameter and the said shaft sections being of substantially the same diameter; and means for retaining the disks on the shaft.

7. A multidisk rotor comprising, in combination, a shaft, the shaft being formed with a plurality of cylindrical portions of circular cross-section and a plurality of longitudinally splined cylindrical sections; a plurality of disks mounted on the shaft, each disk having a hub with a longitudinally splined cylindrical internal opening; the disks being located on the shaft so that the hub of each disk engages both a said portion and a said section of the shaft, the portions engaging the lands of the hub splines for diametrical location of the disks and the faces of the splines of the hubs engaging the faces of the splines of the sections for transfer of torque between the disks and shaft, the disks being adapted to be assembled onto the shaft from one end thereof, the said splined openings and the splined shaft sections being so proportioned that the splines of the disks remote from the said end of the shaft are adapted to slide through the splined portions between the said end and the assembled position of the disks; and means for retaining the disks on the shaft.

ARTHUR W. GAUBATZ.

References Cited in the file of this patent
UNITED STATES PATENTS

| Number | Name | Date |
| --- | --- | --- |
| 581,476 | Blanton | Apr. 27, 1897 |
| 1,370,073 | Utz et al. | Mar. 1, 1921 |
| 1,909,500 | Ornitz | May 16, 1933 |
| 2,579,745 | Lombard et al. | Dec. 25, 1951 |